United States Patent
Geyer et al.

(10) Patent No.: US 11,838,054 B2
(45) Date of Patent: Dec. 5, 2023

(54) SIDE CHANNEL COMMUNICATION FOR AN OPTICAL COHERENT TRANSCEIVER

(71) Applicant: Acacia Communications, Inc., Maynard, MA (US)

(72) Inventors: Jonas Geyer, Somerville, MA (US); Timo Pfau, Somerville, MA (US)

(73) Assignee: Acacia Communications, Inc., Maynard, MA (US)

( * ) Notice: Subject to any disclaimer, the term of this patent is extended or adjusted under 35 U.S.C. 154(b) by 35 days.

(21) Appl. No.: 17/558,873

(22) Filed: Dec. 22, 2021

(65) Prior Publication Data

US 2022/0116114 A1   Apr. 14, 2022

Related U.S. Application Data

(63) Continuation of application No. 16/670,159, filed on Oct. 31, 2019, now Pat. No. 11,239,919.

(60) Provisional application No. 62/782,884, filed on Dec. 20, 2018.

(51) Int. Cl.
*H04B 10/40* (2013.01)
*H04B 10/54* (2013.01)
*H04B 10/61* (2013.01)

(52) U.S. Cl.
CPC ............. *H04B 10/40* (2013.01); *H04B 10/54* (2013.01); *H04B 10/61* (2013.01)

(58) Field of Classification Search
CPC ......... H04B 10/40; H04B 10/54; H04B 10/61
See application file for complete search history.

(56) References Cited

U.S. PATENT DOCUMENTS

| | | | |
|---|---|---|---|
| 8,380,126 B1* | 2/2013 | Ma | H04L 1/22 455/509 |
| 9,991,593 B1* | 6/2018 | Hill | H01Q 3/2676 |
| 2009/0062937 A1* | 3/2009 | Holstegge | G08C 25/00 700/79 |
| 2013/0129354 A1* | 5/2013 | Tanaka | H04B 10/27 398/66 |
| 2013/0182646 A1* | 7/2013 | Shiizaki | H04L 1/0079 370/328 |
| 2013/0341497 A1* | 12/2013 | Zuardy | G01M 5/0091 250/227.14 |
| 2018/0019813 A1* | 1/2018 | Archambault | G01M 11/319 |
| 2018/0157251 A1* | 6/2018 | Cole | H04B 1/69 |
| 2019/0260547 A1* | 8/2019 | Nammi | H04L 5/0058 |
| 2020/0059821 A1* | 2/2020 | Wirth | H04L 1/1896 |
| 2020/0314755 A1* | 10/2020 | Sarkis | H04W 52/0229 |
| 2022/0007092 A1* | 1/2022 | Yang | H04J 14/0267 |
| 2022/0286203 A1* | 9/2022 | Abe | H04J 14/0217 |

* cited by examiner

*Primary Examiner* — Mina M Shalaby
(74) *Attorney, Agent, or Firm* — K&L Gates LLP

(57) ABSTRACT

A method, system and apparatus for optimizing parameters between two optical coherent transceivers connected via an optical link, including determining performance of a second optical receiver; wherein the second optical transceiver uses a set of parameters; and inputting information into a side channel communication between a first optical transceiver and the second optical transceiver to update the set of parameters for the second transceiver.

20 Claims, 7 Drawing Sheets

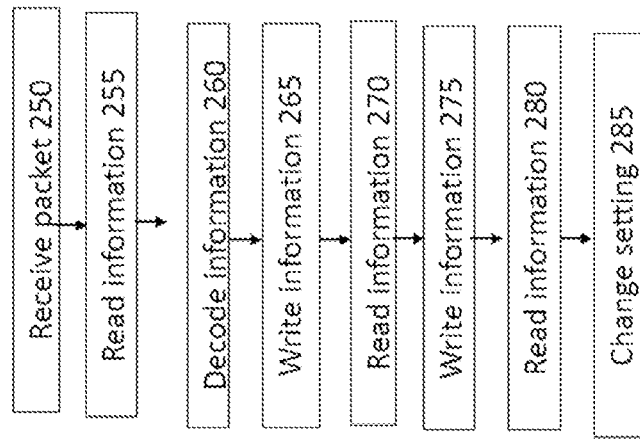
FIG. 2A
FIG. 2C
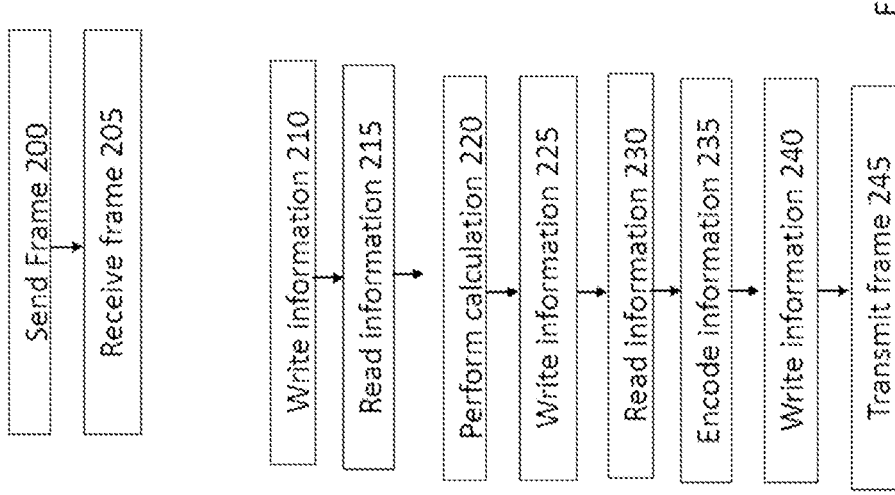
FIG. 2B

SIDE CHANNEL COMMUNICATION FOR AN OPTICAL COHERENT TRANSCEIVER

RELATED APPLICATION

This application is a continuation of U.S. patent application Ser. No. 16/670,159 filed Oct. 21, 2019, titled "Side Channel Communication for an Optical Coherent Transceiver," which claims the benefit of U.S. Provisional Patent Application 62/782,884 filed Dec. 20, 2018, titled "Side Channel Communication," both of which are incorporated herein by reference in their entireties for all purposes.

BACKGROUND

An optical communication system may be used to transmit data between transceivers.

BRIEF DESCRIPTION OF THE FIGURES

Various aspects and embodiments of the application will be described with reference to the following example embodiments. It should be appreciated that the figures are not necessarily drawn to scale.

FIG. 2a is a simplified method for sending and receiving a frame, in accordance with an embodiment of the present disclosure;

FIG. 2b is a simplified method for transmitting side channel information, in accordance with an embodiment of the present disclosure;

FIG. 2c is a simplified method for receiving side channel information, in accordance with an embodiment of the present disclosure;

SUMMARY

Figure 1:
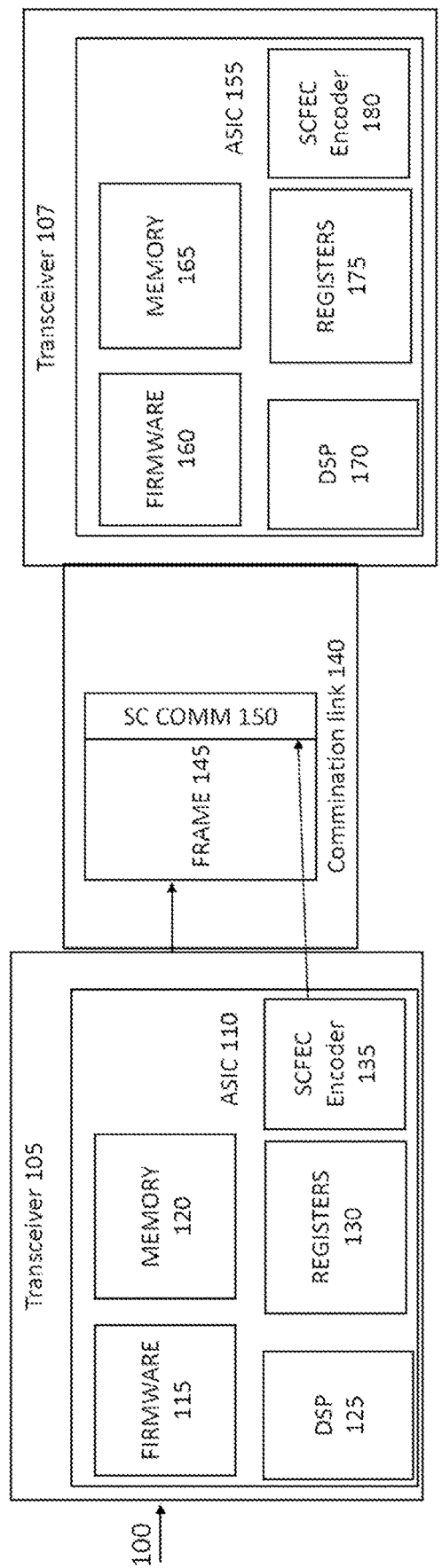
FIG. 1 is a simplified illustration of an optical communication system with a side channel, in accordance with an embodiment of the present disclosure.

A method, system and apparatus for optimizing parameters between two optical coherent transceivers connected via an optical link, including determine performance of a second optical receiver; wherein the second optical transceiver uses a set of parameters; and inputting information into a side channel communication between a first optical transceiver and the second optical transceiver to update the set of parameters for the second transceiver.

DETAILED DESCRIPTION

In most embodiments, the current disclosure has realized that optical coherent transceivers may have a number of settings or parameters that are changeable by a user. In many embodiments, the current disclosure has realized that it may be beneficial to have an automated way to optimize setting of operational parameters. In some embodiments, the current disclosure may enable optimization of parameters and settings of an optical coherent transceiver through information sent over a side channel. In some embodiments, side channel communications may occur from a transceiver of a transceiver pair at another end of an optical link. In many embodiments, using side channel information, an optimal set up of a card may occur during turn-up or initialization. In other embodiments, using side channel information, changes to parameters or settings may be made on the fly. In further embodiments, using side channel information, optimization changes may be made while a system is running. In certain embodiments, a change in bit error rate may trigger changes through side channel communication. In other embodiments, change in Q-margin may trigger changes in settings.

Historically, optical coherent transceivers needed to be configured by a host. Conventionally, a host may select an operational mode, which defines parameters like utilized bandwidth, noise/impairment tolerance and data-rate. Typically, once a transceiver was configured, it may not have been changed unless the transceiver was brought down and brought up again. Usually, side channel communication in optical communication may not have been used.

In most embodiments, two transceivers may be connected to each other through a link such as an optical link. In many embodiments, a transceiver may be able to send information to another transceiver through an optical link. In certain embodiments, information sent over the link may be framed or placed into a line side communication. In most embodiments, a frame or line side communication may correspond to a communication format or protocol containing data and overhead. In many embodiments, it may be possible to use unused overhead to incorporate information for side channel communications. In certain embodiments, amplitude modulation of a signal may be used to add information for side channel communication. In some embodiments, side channel communication may be denoted by the use of a special or unique code word.

In some embodiments, side channel communication may be placed in empty or unused data fields of a packet. In certain embodiments, side channel communication may be packed into an OTN (optical transport network) frame. In other embodiments, side channel information may be packed into a header field of a GCC (general communication channel) header field. In further embodiments, side channel communication may be placed in an OHIO (overhead input/output) interface. In some embodiments, side channel information may be placed in an oFrame (optical frame). In certain embodiments, side channel information may be placed in an OIF (optical interworking forum) DSP (digital signal processing) frame. In further embodiments, side channel information may be placed in a signal by modulating the amplitude of the signal. In still further embodiments, side channel information may be placed anywhere there is additional or blank space in a communication. In further embodiments, a portion or slice of a bandwidth or spectrum between transceivers may be allocated for side channel communication.

In some embodiments, two coherent transceivers may be defined to be in a bi-directional configuration that enables side channel communication, if the coherent transceivers are connected in a way that TX0 (the transmitter at the near-end location A) sends data to RX1 (the receiver at the far-end location B) and there is a way to send side-channel data from TX0 to RX1 and/or data back from RX1 to TX0. In many embodiments, side channel communication may be achieved by another link from TX1 (the transmitter at the far-end location B) to RX0 (the receiver at the near-end location A), or other means such as out of band communication.

In certain embodiments, an architecture of an optical coherent transceiver may enable sending information to a far-end in a side channel in order to optimize parameters of the far-end system. In some embodiments, an architecture of an optical coherent transceiver may enable automatically adjusting parameters of the far-end with information gained at the near-end in order to optimize performance. In other embodiments, a near end may send information to a far end, where the far end returns information to the near end to update its configuration. In certain embodiments, an architecture of an optical coherent transceiver may enable automatically determining a best operating conditions by means of communicating between near-end and far-end through the side channel in an iterative manner. In some embodiments, side channel communication may be send back and forth between transceivers to arrive at an optimized set of settings.

In many embodiments, a coherent transmitter may have knowledge of certain signal parameters, for example about the laser linewidth of the TX laser, or the spectral roll-off of the signal. In most embodiments, information that a coherent transmitter has may be useful for a receiver to optimize its digital signal processing (DSP) parameters. In many embodiments, the current disclosure may enable sending such information to the far-end side in order to optimize parameters on the far-end system.

In most embodiments, a coherent receiver may, for example calculate certain parameters of the received signal like transmitter I/Q power imbalance (where I and Q stand for the in-phase and quadrature-phase component of a complex baseband communication signal respectively), I/Q phase error, I/Q offset, H/V power imbalance (where H and V stand for the horizontal and vertical polarization component of dual polarization optical signal respectively). In some embodiments, near-end and far-end systems may be operating in a bi-directional configuration, or if there are other ways for the near-end receiver to convey information to the far-end transmitter, then such information may be used by the far-end transmitter to update and optimize its parameters and therefore optimize transmission performance. In some embodiments, side channel information may include or be related to transmitter skew, transmitter pulse shape, transmitter laser frequency, transmitter amplitude and phase profile, transmitter chromatic dispersion pre-compensation, modulation format, baud rate, shaping gain, shaping factors, non-linearity compensation for a transmitter, non-linearity pre-compensation, FEC (forward error correction) overhead rate, interleaver settings, bypassing use of a FEC, encryption change information, and encryption key exchanges.

In some embodiments, two coherent transceivers may automatically find a near optimum operating condition aided by communication through a side channel. In certain embodiments, side channel communication may be achieved, for example, by trying to operate in various configurations and then picking the mode that achieves maximum data-rate or maximum tolerance to certain impairments. In certain embodiments, a genetic algorithm may be used to fine tune operational parameters. In certain embodiments, machine learning algorithms may be used to fine tune operational parameters.

In many embodiments, side channel communication may be combined with data from a data source into a frame or line side communication. In some embodiments, side channel data may be encoded using a side channel forward error correction (scFEC) encoder. In many embodiments, side channel information may be written to a memory space. In certain embodiments, a side channel FEC may read information from a memory page when a message is finished. In many embodiments, a side channel FEC may insert encoded side channel information into a frame or line side communication. In some embodiments, a side channel FEC may combine encoded side channel information with data encoded by another FEC. In most embodiments, information in a side channel may have higher levels of redundancy and error correction than other encoded data. In almost all embodiments, a SCFEC may encode side channel information with a higher level of redundancy than is use by a normal FEC. In many embodiments, a receiver side of a signal may have an ASIC pull information out of a side channel communication and place it into a memory.

In some embodiments, side channel information used to optimize system performance may be combined with other side channel information. In certain embodiments, in addition to a transceiver capturing side channel information to be transmitted to another transceiver, an operator of a card may also insert additional side channel or other information into a side channel. In most embodiments, additional information may be combined with system measures, generated, or calculated information and sent across a side channel.

A particular embodiment for finding optimal parameters may be when the transceivers are connected in a bi-directional configuration and the following is performed:

1) Both transceivers start up in lowest modulation-mode (i.e. a certain baud rate, modulation order and data-rate, e.g. 30 GBd, BPSK (binary phase shift keying) and 50 Gbit/s).
2) They communicate via the side-channel to ensure they are in a bi-directional configuration:
   a. Each transceiver creates a unique ID (e.g. ASIC-serial #*2+lane)
   b. Each transceiver sends its own ID to the other end
   c. Each transceiver also sends the ID it received to the other end
   d. Each transceiver checks that its own ID matches the ID that the other transceiver received. If that is not the case, then it is not a bi-directional configuration so the detection process needs to be aborted.
   e. A special case is if the transceiver is looped back to itself, then both IDs that the "other" transceiver sends are identical and match the "own" ID. Potential optimizations of LO-S offsets cannot be made in this case.
3) Transceivers decide on a master (e.g. the transceiver with the lower ID is the master).
4) They measure the latency between the transceiver (in order to know how long to wait for responses, etc.).
5) Both transceiver measure OSNR (optical signal to noise ratio), QdB margin, BER (bit error ratio), UCB (uncorrected block), etc. The master collects the data.
6) If there is enough margin, the master decides to try a different configuration, e.g. wider signal bandwidth, or the next available data-rate supported by the client side, e.g. 25 Gbit/s or 50 Gbit/s higher. It will send the new parameters to the slave, including a time-out which might depend on latency.
7) Once the slave acknowledges the new configuration, both transceivers switch to the new configuration (for example, by changing the modulation order, i.e. bits/symbol).

8) If both transceivers cannot establish the side-channel at the new configuration, then both switch back to the lowest mode (or the previous mode)→algorithm jumps back to 1).
9) If the link can be established, then margin is evaluated again. There is a potential that the new configuration does not allow enough margin (even though it was expected it would), so the master will trigger a switch to the previous mode.
10) The optimum configuration has been established and will be reported to the host.

In many embodiments, increasing a QAM (quadrature amplitude modulation) setting may mean starting at BPSK, switching to QPSK, then 8-QAM, etc.—i.e. increasing the bits/symbol by 1 each step. In most embodiments, a specific loss threshold may refer to the amount of errors experience in the transmission of data between optical transceivers.

In other embodiments, the following settings may be tuned, including but not limited to modulation order (=bits/symbol, e.g. QPSK, 8-QAM), FEC overhead (7%, 15%, 25%, 35%, . . . ), baud-rate (30 to 70 GBd), spectral roll-off (0.0 to 1.0), spectral shape (raised-cosine, root-raised-cosine, . . . ), Tx-pre-emphasis (how many dB/GHz), shaping factor (of probabilistically shaped modulation), and launch power. In certain embodiments, there may be fractional steps from QPSK (quadrature phase shift keying) to 8-QAM (e.g. 2.25 bits/symbol) from which an optimization may choose.

Refer now to the example embodiment of FIG. 1, which illustrates a transceiver system. Data 100 is received by transceiver 105. Transceiver 105 is linked via communication link 140 to Transceiver 107. Transceiver 105 has ASIC (application specific integrated circuit) 110 which has firmware 115, memory 120, DSP 125, Registers 130, and side channel FEC (SCFEC) encoder 135. Transceiver 107 has ASIC 155 which has Firmware 160, Memory 165, DSP 170, Registers 175, and side channel FEC (SCFEC) encoder 180. Transceiver 105 sends frame 145 across communication link 140. Frame 145 has side channel communication 150. Transceiver 107 receive frame 145 from communication link 140. Refer as well to the example embodiment of FIG. 2a, which illustrates sending a frame. Transceiver 105 sends Frame 145 to Transceiver 107 (Step 200). Transceiver 107 receives Frame 145 (Step 205).

Refer now to the example embodiments of FIGS. 1 and 2b, which illustrate creating and populating a side channel communication. DSP 125 writes information into registers 130 (Step 210). Firmware 115 reads information from registers 130 (Step 215). Firmware 115 performs calculation (Step 220). Firmware 115 writes information into memory 120 (Step 225). SCFEC 135 reads side channel information from memory 120 (Step 230). SCFEC 135 encodes the information in memory 120 (Step 235). SCFEC 135 encoded the information in a highly redundant manner that is more robust and has more error checking information than data that is written into frame 145. The additional level of redundancy enables side channel information to be recovered, even when data encoded by a different FEC is unable to be decoded due to excessive errors. SCFEC 135 writes side channel information that has been encoded into side channel communication 150 of frame 145 (Step 240). Frame 145 is transmitted from transceiver 105 to transceiver 107 (Step 245).

Refer now to the example embodiments of FIGS. 1 and 2c, which illustrate extracting side information from a frame with side channel communication. Transceiver 107 receives packet (Step 250). ASIC reads side channel information from SC COMM 150 (Step 255). SCFEC 180 decodes side channel information (Step 260). SCFEC 180 writes side channel information into memory 165 (Step 265). Firmware 160 reads side channel information from memory 165 (Step 270). Firmware 160 writes information into registers 175 (Step 275). DSP 170 reads information from registers 175 (Step 280). Settings on transceiver 107 are changed (step 285).

Figure 3:
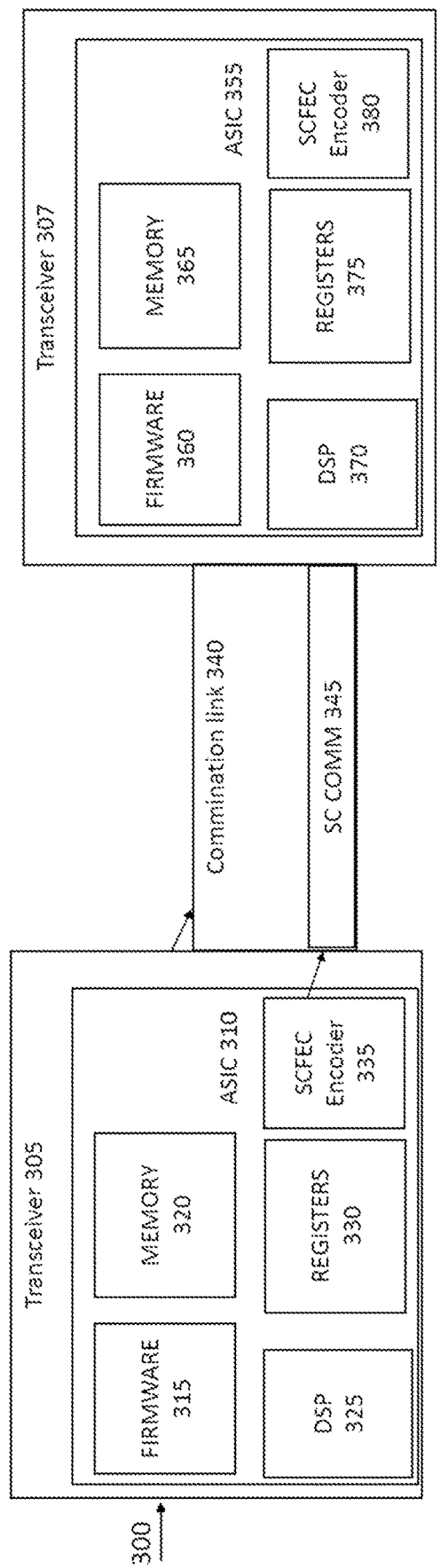
FIG. 3 is an alternative simplified illustration of an optical communication system with a side channel, in accordance with an embodiment of the present disclosure.

Refer now to the example embodiment of FIG. 3, which illustrates an alternative embodiment of side channel communication where a portion of a bandwidth is reserved for side channel information. In the example embodiment of FIG. 3, Transceiver 305 and 307 are connected by communication link 340 and each transceiver has an ASIC, such as ASIC 310 and 355 respectfully. Communication link 340 has a portion of its bandwidth dedicated to side channel communication as SC COMM 345. In this example embodiment, SCFEC encoder 335 writes side channel communication information into SC COMM 345. Transceiver 307 removes side channel communication from SC COMM 345.

Figure 4:
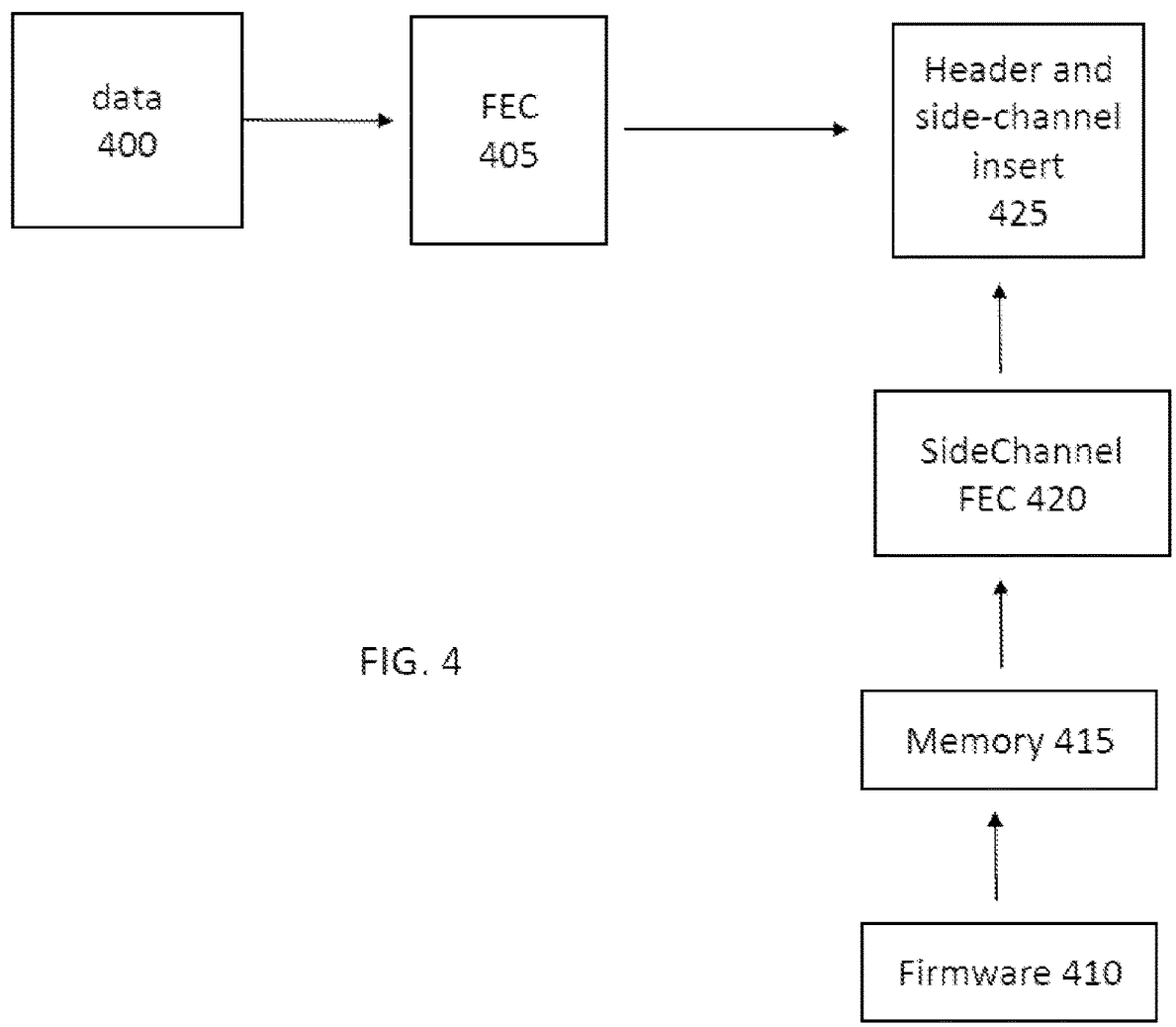
FIG. 4 is a simplified illustration of combining side channel and other information, in accordance with an embodiment of the present disclosure.
Figure 5:
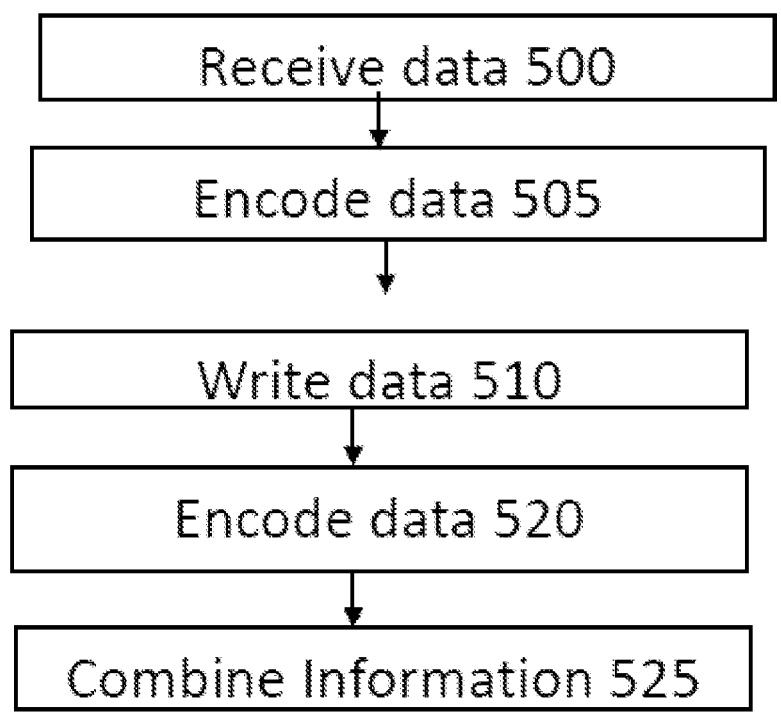
FIG. 5 is a simplified method for combining side channel and other information, in accordance with an embodiment of the present disclosure.

Refer now to the example embodiments of FIGS. 4 and 5, which illustrate a sample information flow for side channel communication. A transceiver, such as transceiver 105 of FIG. 1, receives data 400 (step 500). FEC 405 of the transceiver encodes data 400 (step 505). Firmware 410 of a transceiver, such as transceiver 105 of FIG. 1, writes side channel information into memory 415 (step 510). Once firmware 410 is finished writing side channel information into memory 415, side channel FEC 420 encodes the side channel information (step 520). Data 400 encoded by FEC 405 and side channel information encoded by side channel FEC 420 are combined into a header and side channel insert 425 (step 525).

Figure 6:
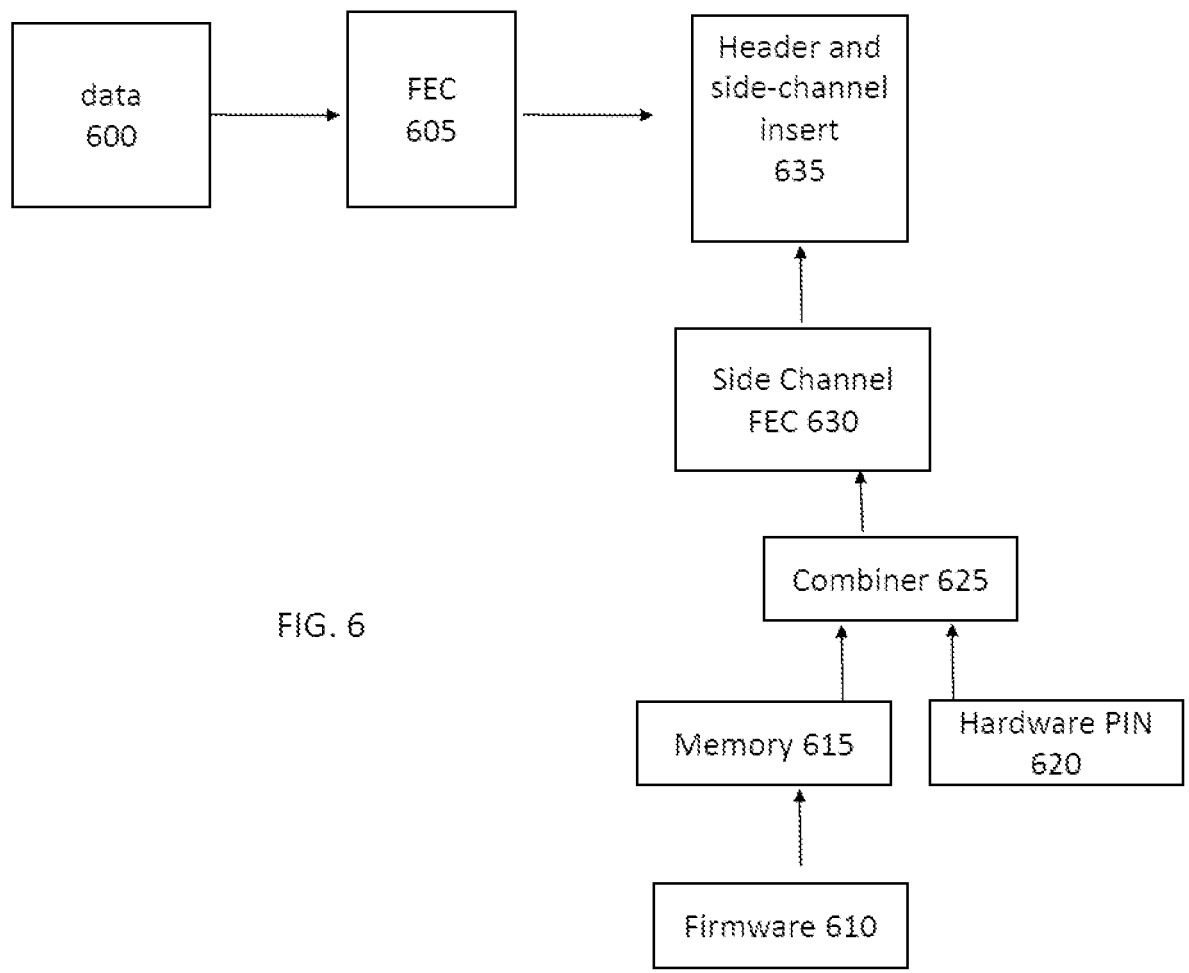
FIG. 6 is a simplified illustration of combining side channel and other information, in accordance with an embodiment of the present disclosure.
Figure 7:
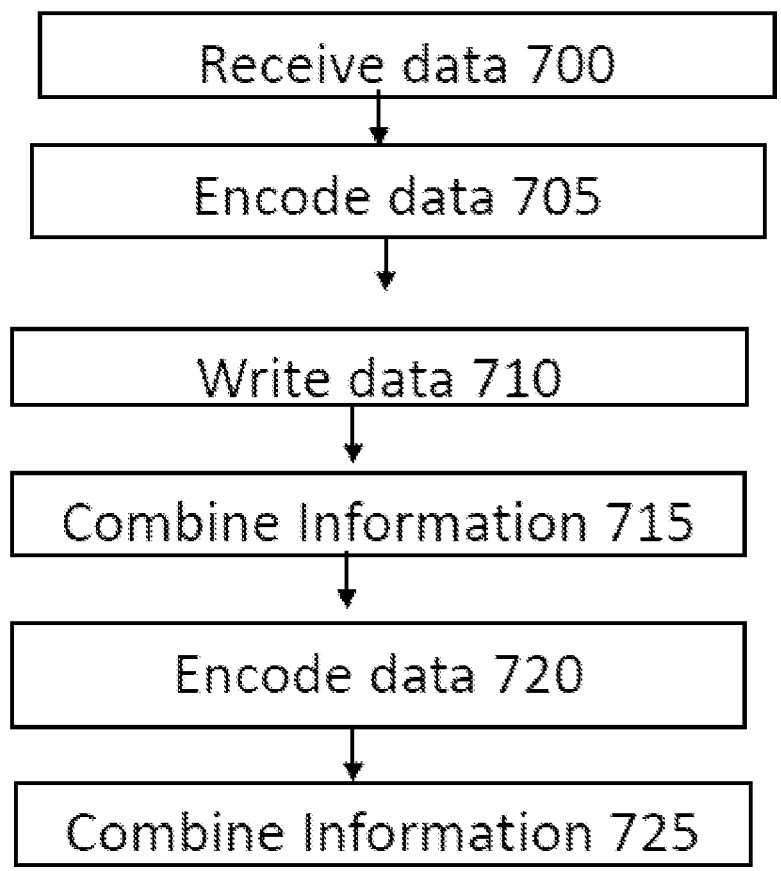
FIG. 7 is a simplified method for combining side channel and other information, in accordance with an embodiment of the present disclosure.

Refer now to the example embodiments of FIGS. 6 and 7, which illustrate a sample information flow for side channel communication. A transceiver, such as transceiver 105 of FIG. 1, receives data 600 (step 700). FEC 605 of the transceiver encodes data 600 (step 705). Firmware 610 of a transceiver, such as transceiver 105 of FIG. 1, writes side channel information into memory 615 (step 710). Once firmware 610 is finished writing side channel information into memory 615, data from memory is combined by combiner 625 with information from hardware PIN 620 (step 715). In this example embodiment, data from hardware PIN 620 represents data input by a controller of a transceiver. This data is additional data to the data information being received and transmitted but may not be side channel information used to optimize or change a transceiver's settings. Side channel FEC 630 encodes the combined information from combiner 625 (step 720). Data 600 encoded by FEC 605 and side channel information encoded by side channel FEC 630 are combined into a header and side channel insert 635 (step 725).

In many embodiments, firmware on a transceiver may perform calculations to determine what information is to be put into a side channel. In other embodiments, firmware on a transceiver may perform calculations on information retrieved from a side channel to determine what parameters or settings should be changed. In some embodiments, bit error rate may be used in the calculations or to determine what settings or parameters should be changed.

In some embodiments, a device controller may be any type of controller. In certain embodiments, a microprocessor may be a device controller and run a control loop. In other embodiments, an ASIC may be a device controller and may run a control loop. In further embodiments, a device controller may be an analog circuitry. In many embodiments, a bias controller may be a device controller. In certain embodiments, a bias controller may be an analog circuitry.

In some embodiments, one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A method for optimizing parameters between two optical coherent transceivers connected via an optical link, the method comprising:
    operating the two optical transceivers using a set of parameters;
    determining performance based on the set of parameters; and
    inputting information into a side channel communication to update the set of parameters; wherein the side channel communication is encoded by a side channel forward error correction encoder at a higher level of redundancy, and with higher error correction, than non-side channel communications sent over the optical link.

2. The method of claim 1 wherein the information is used to optimize available bandwidth between the two optical coherent transceivers.

3. The method of claim 1 wherein the inputting information into the side channel communication includes iteratively changing the set of configurations to increase spectral efficiency of the optical link.

4. The method of claim 1 wherein the information in the side channel is sent from a near end optical transmitter of the optical transmitters to a far end optical transmitter of the optical transmitters to optimize the setting of the far end optical transmitter.

5. The method of claim 1 further comprising:
    sending the information in the side channel from a near end optical transmitter of the optical transmitters to a far end optical transmitter of the optical transmitters;
    determining derivative information at the far end optical transmitter useful to the near end optical transmitter;
    sending the derivative information back to the near end optical transmitter through inputting further information into the side channel; and
    using the derivative information at the near end optical transmitter to optimize the near end optical transmitter.

6. The method of claim 1 wherein the side channel communication is constructed using parts of packets transmitted across the optical link.

7. The method of claim 1 wherein the side channel communication comprises a portion of the bandwidth of the optical link.

8. The method of claim 1 wherein the side channel communication is created by modulating the amplitude of a signal sent across the optical link.

9. A system for optimizing parameters between two optical coherent transceivers connected via an optical link, the system comprising:

two optical transceivers;

an optical link; and logic enabled to:

operate the two optical transceivers using a set of parameters;

determine performance based on the set of parameters; and input information into a side channel communication to update the set of parameters; wherein the side channel communication is encoded by a side channel forward error correction encoder at a higher level of redundancy, and with higher error correction, than non-side channel communications sent over the optical link.

10. The system of claim 9 wherein the information is used to optimize the availability bandwidth between the two optical coherent transceivers.

11. The system of claim 9 wherein the inputting information into the side channel communication includes iteratively changing the set of configurations to increase spectral efficiency of the optical link.

12. The system of claim 9 wherein the information in the side channel is sent from a near end optical transmitter of the optical transmitters to a far end optical transmitter of the optical transmitters to optimize the setting of the far end optical transmitter.

13. The system of claim 9 wherein the logic further comprising:

sending the information in the side channel from a near end optical transmitter of the optical transmitters to a far end optical transmitter of the optical transmitters;

determining derivative information at the far end optical transmitter useful to the near end optical transmitter;

sending the derivative information back to the near end optical transmitter through inputting further information into the side channel; and using the derivative information at the near end optical transmitter to optimize the near end optical transmitter.

14. An apparatus for optimizing parameters between two optical coherent transceivers connected via an optical link, the apparatus comprising:

a first optical transceiver; and logic enabling the optical transceiver to:

determine performance of a second optical receiver; wherein the second optical transceiver uses a set of parameters; and input information into a side channel communication between the first optical transceiver and the second optical transceiver to update the set of parameters for the second transceiver; wherein the side channel communication is encoded by a side channel forward error connection encoder at a higher level of redundancy, and with higher error correction, than non-side channel communications sent over the optical link.

15. The apparatus of claim 14 wherein the information is used to optimize available bandwidth between the first optical coherent transceiver and the second optical transceiver.

16. The apparatus of claim 14 wherein the inputting information into the side channel communication includes iteratively changing the set of configurations to include spectral efficiency of an optical link.

17. The apparatus of claim 14 wherein the information in the side channel is sent from the first optical transmitter to the second optical transmitter to optimize the setting of the second optical transceiver.

18. The apparatus of claim 14 wherein the side channel communication is constructed using parts of packets transmitted across an optical link.

19. The apparatus of claim 14 wherein the side channel communication comprises a portion of the bandwidth of an optical link.

20. The apparatus of claim 14 wherein the side channel communication is created by modulating the amplitude of a signal sent across an optical link.

\* \* \* \* \*